Nov. 3, 1931.                 J. SCHAEFFERS                 1,830,565
                                ROTARY PLOW
                        Filed Jan. 30, 1928        2 Sheets-Sheet 1

INVENTOR.
JOSEPH SCHAEFFERS
BY
ATTORNEYS.

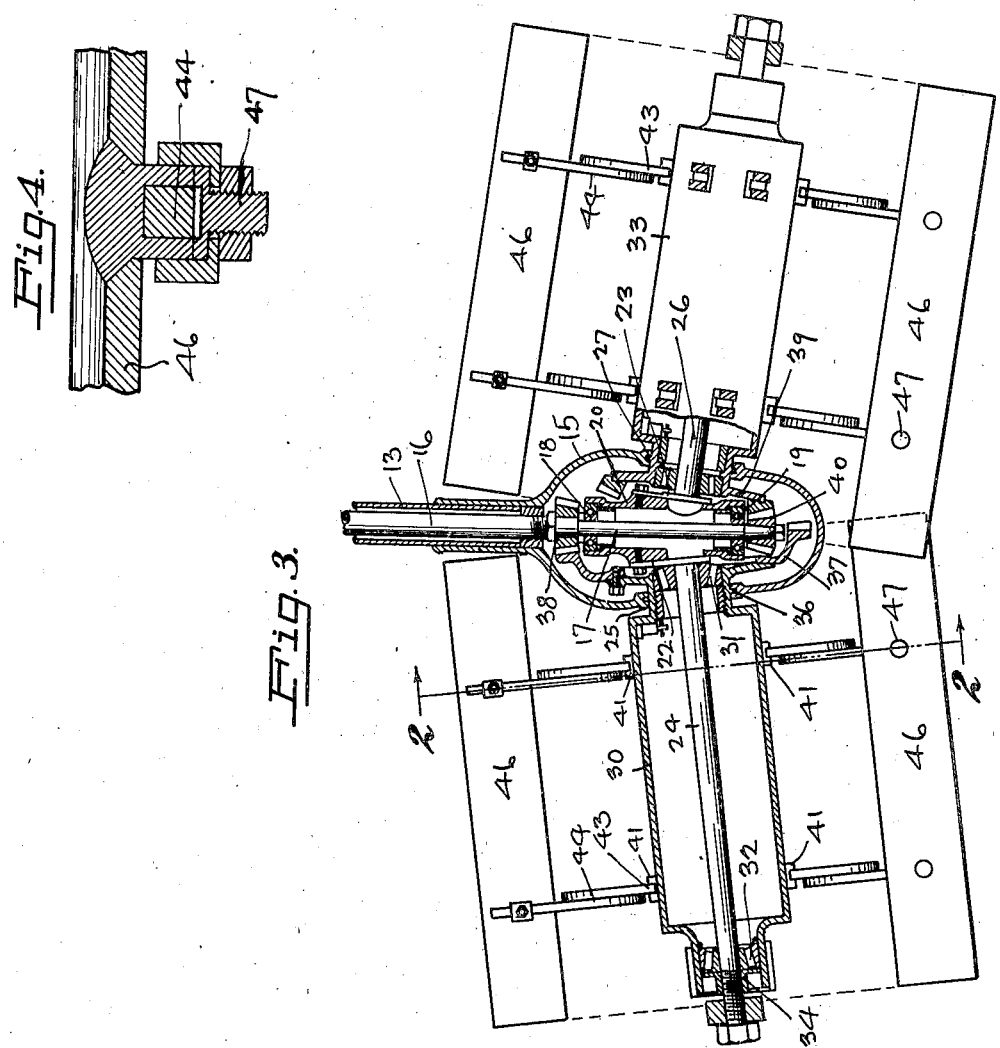

Patented Nov. 3, 1931

1,830,565

UNITED STATES PATENT OFFICE

JOSEPH SCHAEFFERS, OF WICHITA, KANSAS

ROTARY PLOW

Application filed January 30, 1928. Serial No. 250,417.

This invention relates particularly to a rotary plow.

An object of the invention is to provide in a rotary plow, a pair of separate and related plowing rotors arranged slantwise to the direction of movement of the plow, to obtain a plowing area substantially equal to the lengths of both plowing rotors.

A further object of the invention is to provide a tractor or plowing vehicle having a drive shaft extended therefrom and tilling members extended outwardly on each of the opposite sides of said drive shaft and sloped back slightly therefrom, each tilling member having a plurality of spaced and circumferentially arranged tilling blades therearound, whereby, due to the angular alignment of the tilling members on the drive shaft, said tilling blades interlap at the back side thereof, and form a space between them on the forward side thereof, to permit the drive shaft to engage with the rotors for rotation purposes.

Other objects of the invention are to provide a rotary plow of the knife blade type, in which the plowing blades are arranged slantwise to the direction or path of movement of the plowing vehicle so that the cutting edges of each blade will enter the soil at a slant, thereby reducing the power required for entering the blades into the soil, below that required for entering cutters into the soil at right angles thereto; to provide a rotary plow in which the area plowed is continuous and uninterrupted and substantially greater than the width of the towing vehicle; and to provide a rotary plow operated by a driving mechanism that is completely housed to protect the operating parts from being effected by dust, dirt, and the like.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying two sheets of drawings:

Fig. 3 is a plan section of the pair of plowing rotors taken on the line 3—3 of Fig. 2.

Fig. 4 is a cross section taken through one of the bolts for securing the cutting blade to the spring finger.

Figure 1:
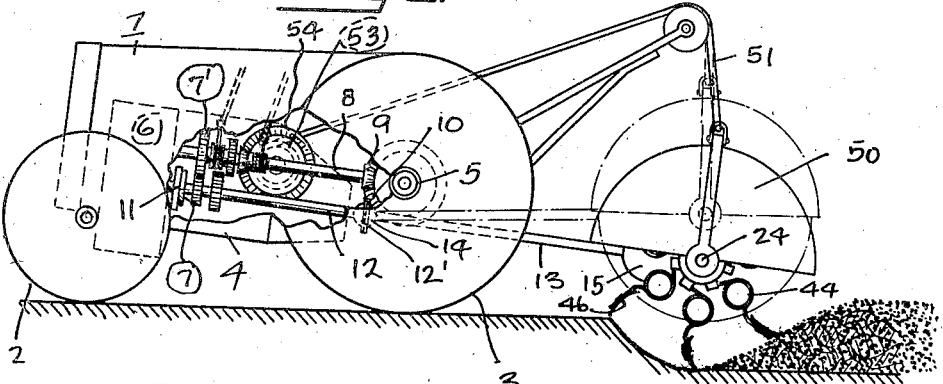
Fig. 1 represents a side elevation of a rotary plow constructed in accordance with my invention.
Figure 2:
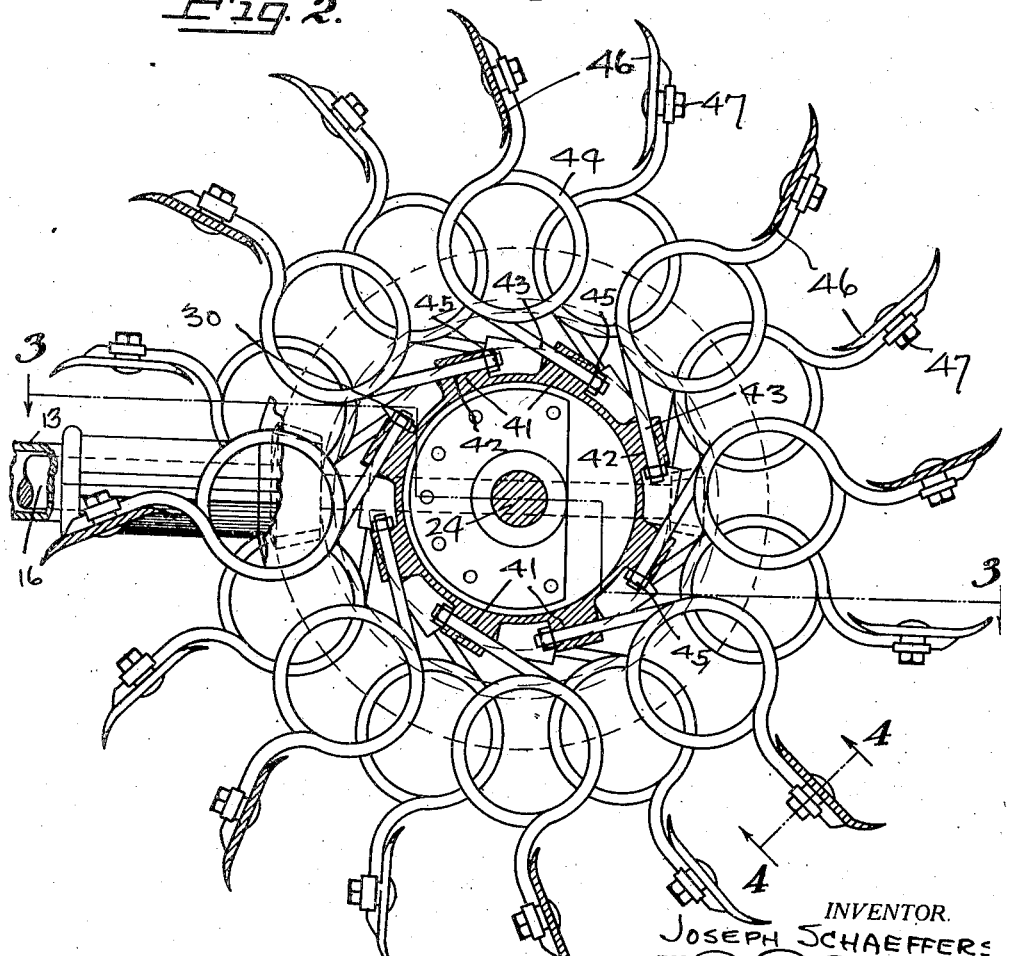
Fig. 2 is an enlarged cross section taken through Fig. 3 on the line 2—2, showing the method of constructing the plow blade rotor.

The majority of rotary plows and rotary cultivators are provided with chain drives connected to the outside ends of the plow or cultivator driving shafts. The disadvantage of the chain drive, is the difficulty of housing the same sufficiently well to protect it from dust and dirt accumulations, and also the necessity of taking up the slack in said chains. Bevel gear drives have also been used to drive the rotary plow, but with this construction it is also a difficult matter to properly house the operating parts. In some instances the plowing member has been provided with a cut out portion in the center thereof, into which the customary automobile type of center drive is extended to rotate the rotary plow, but this construction is objectionable in that the center space forms a strip, the width of the space, that remains unplowed. In some rotary plows, an additional plow, such as a mould-board plow, is used to break up this unplowed center strip, but this does not make as good a job as by having the plowing rotor make a cut of the full width with the initial plowing operation, such as my device contemplates.

In detail the construction illustrated in the drawings comprises a motor driven vehicle or tractor 1, having front and rear traction wheels 2 and 3 thereon. The vehicle 1 is provided with a frame 4 mounted on an axle housing 5, within which mechanism for driving the rear traction wheels 3, is contained. A motor 6 is provided on the vehicle 1 and is connected to a change speed or variable speed mechanism 7 for driving the tractor over the ground at selective rates of speed. Change speed gearing 7' is mounted adjacent the main driving transmission 7 and is connected by a drive shaft 8 and meshing beveled gears 9 and 10, to the axles for driving the traction wheels 3. The main drive shaft from the engine is connected by a clutch 11 to the transmission 7 and to a driven shaft 12 contained within the vehicle transmission. The driven shaft 12 extends to a point adjacent the rear end of the vehicle and is housed in a universal joint housing 12'.

A hollow or tubular arm 13 has a universal joint 14 at one end thereof, that is universally connected to the universal joint connection 12' on the vehicle, whereby the arm 13 may be swung either in lateral directions, or to and from the traction surface.

The rear end of the arm 13 communicates with an enlarged gear housing 15. A driven shaft 16 is journaled within the arm 13, being universally connected at one end thereof to the driven transmission shaft 12 extended from the engine, and having the opposite end of said driven shaft 16 rotatably journaled within an enlarged housing 15. The shaft 16 within the housing 15, is reduced in diameter, at 17, and a pair of anti-friction bearings 18 and 19 are mounted in spaced relation on said shaft. A casing 20 contains at its opposite ends anti-friction bearings 18 and 19, on which the shaft 16 is free to rotate within the hollow casing 20.

The side walls of the housing 15 are slanted or tapered and are not parallel to the axis of the shaft 16. The purpose of providing angularly disposed side faces on the housing 15 is to form right angled bearing supports for transversely extended tilling members, each of which are adapted to extend rearwardly, slantwise, and not at exactly right angles to the path of movement of the tilling machine.

Diametrically opposite sides of the casing 20 are faced off and the shaft flanges 22 and 23 are securely bolted thereto. A shaft 24 is secured to the plate 22 and projects outwardly through a bearing opening 25 in the casing 15 at a rearwardly inclined angle to the axis of the shaft 16. A similar shaft 26 is secured to the opposite plate 23 and projects outwardly through the bearing port 27 in the opposite side of the housing 15 at a rearwardly inclined angle, that is complementary to the placement of the other shaft 24. The axes of the shafts 24 and 26 extend slantwise rearwardly on opposite sides of the axis of the main shaft 16, so that the tilling members to be mounted on the said shafts 24 and 26, in the manner to be hereinafter described, will enter the soil to be plowed or tilled at a slant angle rather than at right angles to the direction of movement of the tilling vehicle, as will be hereinafter explained in detail.

A drum or rotor 30 is rotatably journaled at its opposite ends on roller bearings 31 and 32 that are mounted adjacent the opposite ends of the shaft 24. A similar drum or rotor 33 is mounted on similar supporting bearings journaled on the shaft 26 adjacent each of its opposite ends. The ends of the shafts 24 and 26 are suitably threaded to receive lock nuts 34 thereon, for the purpose of holding each of the rotors 30 and 33 in a predetermined position on each of the shafts 24 and 26.

The end of the rotor 30 is reduced in diameter where it passes into the casing 15, being suitably journaled and packed at 36 in the bearing opening 25 formed in the housing 15. A bevel gear 37 is provided on the end of the rotor 30 and meshes with a driving bevel pinion 38 that is fixed on the reduced end 17 of the driven shaft 16. A bevel gear 39 of lesser diameter than the bevel gear 37 is secured to the end of the rotor 33 within the housing 15, and said bevel gear 39 meshes with a driven bevel pinion 40 on the end of the shaft 17. The bevel pinions 38 and 40 face each other on the shaft 17 so that in meshing with the gears 37 and 39, said bevel gears, and consequently the rotors 30 and 33, will rotate in the same direction. Although I have shown and described a particular type of driving mechanism within the housing 15, it is to be understood that it would be clearly within the scope of the invention to substitute some other form of driving mechanism therefor, capable of rotating the drums or rotors 30 and 33 in the manner to be described.

Each of the rotors 30 and 33 are provided with a plurality of projections or lugs 41 arranged in spaced circumferential relation therearound. I have shown the embossments 41 arranged adjacent each of the opposite ends of the rotors, although it would be clearly within the purview of the invention to make a different arrangement of the said lugs. Each projection 41 is provided with a hole 42 drilled throughout in a direction substantially tangentially to the circumference of the rotor. An end 43 of a ground tilling or cutting finger 44 is held in each of the projections. A lock nut 45, threadedly engages the end of the tilling tool 44 within the projection to hold the tilling tool securely locked thereon. Each ground tilling or cutting finger 44 consists of a length of metal bar stock suitably bent to form a spring convolution therein, and the outer end of the said finger extends radially outward from the rotor circumference. Each of the spring fingers 43 are arranged in pairs, and each pair or set of rotor spring fingers is adapted to be connected by a plowing blade or knife 46. The blade 46 has both of its longer sides sharpened so as to facilitate the entry of the said blade into and from the soil to be tilled or plowed. Each of the blades are held to the free ends of the spring fingers by a nut and bolt assembly 47 in order to facilitate quick mounting and demounting of the blades from the spring fingers. Although I have shown the blades mounted on the outer ends of the spring fingers, with sharpened edges, it is to be understood that the blades might be entirely omitted from the construction and the spring fingers themselves sharpened to perform the tilling or plowing action. The word "blades" as used herein is defined to mean any sharpened cutting device mounted around the periphery of the rotor, to perform the tilling or plowing operation.

As hereinafter set forth, the shafts 24 and 26 that support the plowing blade rotors, are not in axial alignment, nor do I contemplate that a single shaft might be extended outwardly equidistantly on opposite sides of the driving arm, as is the case with some types of rotary plows and rotary cultivators. Where a single shaft rotary plow is used with tilling or cutting members on each of the opposite ends thereof, it necessitates that the cutting arms be eliminated from the center, due to the fact that the tilling member is driven from the center by the vehicle engine. In my invention I provide separate rotors, each one of which is connected at an end thereof to the source of power and each of the plowing members is positioned rearwardly, slantwise, therefrom so that the plowing blades along the back part of the tilling device interlap and present a plowing surface that extends the length of both rotors. With my construction, the plowing rotors plow or cut the ground across the entire length of both rotors and it is not necessary to employ some means such as a "middle buster" or mould board plow to break up the soil that is not plowed by the rotors. The interlapping of the cutting blades at the back side of the rotors, due to the slanting arrangement thereof on the vehicle, leaves a space between the facing ends of the rotors on the front side thereof, through which the driven shaft 16 from the vehicle extends, to convey the driving power to the rotary plowing members.

Each of the cutting blades are of the knife type, and the slantwise placement of the rotors on the vehicle, makes it possible for the blades to enter the soil with their cutting edge at a slant to the direction of movement of the vehicle and reduces the power required for cutting or plowing the soil, below that of a rotor cutting at right angles to the direction of movement of the vehicle. At the same time the blades can be set so as to lift the soil at substantially right angles to the direction of travel so that the plowed soil is thrown backwards and not sidewise. The spring finger mountings for the cutting blades will yield or give if the cutting tool should strike a stone or piece of material too hard to be cut through, and in that manner will permit the device to be operated under any and all working conditions. The cutting blades are shown in the shape of knife blades and of the double edged type, and are so curved that they are self-sharpening. The soil that is cut by one edge passes over the edge that is not cutting and in such a way as to have a sharpening effect so that the blades need only an occasional reversing.

A hood or cover 50 is mounted over the rotors 30 and 33 and the opposite ends of said hood are supported on the ends of the rotor shafts 24 and 26. A cable 51 is connected to the hood 50, and said cable supports the plowing rotors in position over the ground to be tilled or plowed. The opposite end of the cable passes around a drum or windlass 53 mounted on the towing vehicle, said cable drum being in turn connected to the engine transmission and operated thereby for the purpose of reeling in the cable and raising the plowing blades relative to the traction surface. A brake drum 54 is connected to the cable drum and by means of the brake drum, the cable drum may be held in any selected position in order to support the plowing rotors in any desired position relative to the ground to be plowed. The universal joint connection between the plowing blades and the tilling vehicle, permits the said plowing blades to be raised or lowered at will, and the plowing device operated at any and all desired levels.

Having thus described this invention, what I claim and desire to secure by Letters Patent is:

1. A rotary plow comprised of separate rotary members having the axes thereof arranged at an angle to each other; a plurality of plowing blades arranged in spaced, circumferential relation around each of the rotary members, the disalignment of the rotary members placing the plowing blades on one rotary member in interlapping relationship with the plowing blades on the other rotary member; and means to advance the plow over the ground.

2. A rotary plow comprised of separate rotary members having the axes thereof arranged at an angle to each other; a plurality of plowing blades arranged in spaced, circumferential relation around each of the rotary members, the disalignment of the rotary members placing the plowing blades on one rotary member in interlapping relationship with the plowing blades on the other rotary member; and means to rotate each of the rotary members with the plowing blades thereon in unison.

3. A plowing device comprised of a traction vehicle; separate rotary members having the axes thereof arranged at an angle to each other and at substantially right angles to the path of movement of the traction vehicle; means on the traction vehicle to rotate each of the separate rotary members; and a plurality of plowing blades arranged in spaced, circumferential relation around each of the rotary members, the blades on facing ends of each of the members moving in interlapping relation to form an uninterrupted plowing surface across substantially the entire length of both rotary members.

4. A plowing device comprised of a traction vehicle; separate rotary members having the axes thereof arranged at an angle to the path of movement of the traction vehicle; means on the traction vehicle to rotate each of the separate rotary members; means to raise and lower the rotary members in unison relative to the ground to be plowed; and a plurality of plowing blades arranged in spaced, circumferential relation around each of the rotary members, the blades on facing ends of each of the members moving in interlapping relation to form an uninterrupted plowing surface across substantially the entire length of both rotary members.

5. A plow comprised of a tractor; and separate plowing members adjustably connected to said tractor, each of said plowing members having blades arranged in spaced, circumferential relation thereon and laterally to the path of travel of the tractor, the blades on facing ends of each of the members rotating in interlapping relation to form an uninterrupted plowing surface across the entire length of both plowing members.

6. A plow comprised of a tractor; separate plowing members adjustably connected to said tractor, each of said plowing members having blades arranged in spaced, circumferential relation thereon and laterally to the path of travel of the tractor, the blades on facing ends of each of the members rotating in interlapping relation to form an uninterrupted plowing surface across the entire length of both plowing members; and means on the tractor to raise and lower the plowing members relative to the ground to be plowed.

7. A plow comprised of a tractor; separate plowing members adjustably connected to said tractor, each of said plowing members having blades arranged in spaced, circumferential relation thereon and laterally to the path of travel of the tractor, the blades on facing ends of each of the members rotating in interlapping relation throughout a part of a revolution to form an uninterrupted plowing surface across the entire length of both plowing members; and means to rotate each of the plowing members from the tractor.

8. A rotary plow comprised of a frame having a pair of casings rotatably mounted thereon; a prime mover on said frame to rotate each of the casings; and plowing blades arranged in spaced, circumferential relation on each casing and at substantially right angles to the path of travel of the plow, the blades on facing ends of each of the casings rotating in interlapping relation throughout a part of a revolution to form an uninterrupted plowing face across the entire length of both casings.

9. A rotary plow comprised of a frame having a pair of casings rotatably mounted thereon; a prime mover on said frame to rotate each of the casings; plowing blades arranged in spaced, circumferential relation on each casing and at substantially right angles to the path of travel of the plow, the blades on facing ends of each of the casings rotating in interlapping relation throughout a part of a revolution to form an uninterrupted plowing face across the entire length of both casings; and means on the frame to raise and lower the plowing blade casings relative to the ground to be plowed.

10. A rotary plow comprised of a frame; a pair of independent casings rotatably mounted on said frame, each casing having plowing blades in spaced, circumferential relation therearound, and having the axes of the casings out of axial alignment, whereby the blades on facing ends of each of the casings rotate in interlapping relation throughout a part of a revolution to form a continuous plowing area across the entire length of both casings and on the opposite side facing plowing blades are spaced apart; and a driving means on the frame extended through the space between the ends of the facing blades to rotate the plowing blade casings.

11. A rotary plow comprised of a frame; a pair of independent casings rotatably mounted on said frame, each casing having plowing blades in spaced, circumferential relation therearound, and having the axes of the casings out of axial alignment, whereby the blades on facing ends of each of the casings rotate in interlapping relation throughout a part of a revolution to form a continuous plowing area across the entire length of both casings and on the opposite side said facing plowing blades are spaced apart; a driving means on the frame extended through the space between the ends of the facing blades to rotate the plowing blade casings; and means on the frame to raise and lower the plowing blade casings relative to the traction surface.

12. A rotary plow comprised of a frame having an engine thereon; a drive shaft extended from said engine; rotors extended outwardly on an inclined angle on opposite sides of the drive shaft, and transversely to the path of movement of the plow; and plowing blades arranged in spaced, circumferential relation around said rotors.

13. A rotary plow comprised of a frame having an engine thereon; a drive shaft extended from said engine; rotors extended outwardly on an inclined angle on opposite sides of the drive shaft, and transversely to the path of movement of the plow; and plowing blades arranged in spaced, circumferential relation around said rotors, the blades on the facing ends of said rotors moving in interlapping relationship throughout a part of a revolution to form a continuous plowing face across the entire length of both rotors.

14. A rotary plow comprised of a frame having an engine thereon; a drive shaft extended from said engine; rotors extended outwardly on an inclined angle on opposite sides of the drive shaft, and transversely to the path of movement of the plow; plowing blades arranged in spaced, circumferential relation around said rotors; and means on the frame to raise and lower the plowing blade rotors relative to the ground to be plowed.

15. A rotary plow comprised of a frame having an engine thereon; a drive shaft extended from said engine; rotors extended outwardly on an inclined angle on opposite sides of the drive shaft, and transversely to the path of movement of the plow; plowing blades arranged in spaced, circumferential relation around said rotors, the blades on the facing ends of said rotors moving in interlapping relationship throughout a part of a revolution to form a continuous plowing face across the entire length of both rotors; and means on the frame to raise and lower the plowing blade rotors relative to the ground to be plowed.

16. A rotary plow comprised of a pair of driven rotors arranged in angular alignment to each other; sets of spring fingers projected radially outward from each rotor circumference in spaced relation therearound; plow blades secured to the spring fingers whereby all plow blades lie in concentric relation to the rotor axis, the facing ends of the plow blades on each of the rotors interlapping throughout a portion of their path of rotation due to the angular placement of the rotors and forming a space between the facing plow blade ends on a side opposite the interlapping ends, through which means to drive the rotors extends.

17. A tilling machine comprising a motor driven vehicle; an arm having a universal joint connection with the rear portion of the vehicle; transversely extending rotary tilling members comprised of a pair of independent rotors, each being journaled at an end thereof in the rear end portion of the arm; and a driven gear on the journaled end of each tilling member; a drive shaft extended thru the arm; a pair of driving gears on the shaft, each of said driving gears meshing with one of the driven gears, said driven gears being at an angle to each other.

18. A tilling machine comprising a motor driven vehicle; an arm having a universal joint connection with the rear portion of the vehicle; transversely extending rotary tilling members comprised of a pair of independent rotors, each being journaled at an end thereof in the rear end portion of the arm; a driven gear on the journaled end of each tilling member; a drive shaft extended thru the arm; a pair of driving gears on the shaft, each of said driving gears meshing with one of the driven gears, said driven gears being at an angle to each other; and means for regulating the depth of the cut of the tilling member.

19. A tilling machine comprising a motor driven vehicle; an arm having a universal joint connection with the rear portion of the vehicle; transversely extending rotary tilling members comprising a pair of independent rotors each having an end thereof journaled in the rear end portion of the arm, and each rotor extending rearwardly slantwise from said arm; a driven gear on the journaled end of each tilling member; a drive shaft extended thru the arm; a pair of driving gears on the shaft, each of said driving gears meshing with one of the driven gears, said driven gears being at an angle to each other; and means for regulating the depth of the cut of the tilling member.

In testimony whereof, I have hereunto set my hand at San Francisco, California, this 14th day of November, 1927.

JOSEPH SCHAEFFERS.